(12) United States Patent
Ozcaglar et al.

(10) Patent No.: US 11,016,983 B2
(45) Date of Patent: May 25, 2021

(54) ENTITY-LEVEL SEARCH MODELS WITH TREE INTERACTION FEATURES

(71) Applicant: Microsoft Technology Licensing, LLC, Redmond, WA (US)

(72) Inventors: Cagri Ozcaglar, Sunnyvale, CA (US); Sahin Cem Geyik, Redwood City, CA (US); Brian Schmitz, Sunnyvale, CA (US); Prakhar Sharma, Newark, CA (US); Erik Eugene Buchanan, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 16/110,434

(22) Filed: Aug. 23, 2018

(65) Prior Publication Data

US 2020/0065396 A1 Feb. 27, 2020

(51) Int. Cl.
*G06F 16/2457* (2019.01)
*G06F 16/248* (2019.01)
*G06F 16/9535* (2019.01)
*G06N 20/00* (2019.01)

(52) U.S. Cl.
CPC ...... *G06F 16/24578* (2019.01); *G06F 16/248* (2019.01); *G06F 16/9535* (2019.01); *G06N 20/00* (2019.01)

(58) Field of Classification Search
None
See application file for complete search history.

(56) References Cited

U.S. PATENT DOCUMENTS

| 2019/0034882 | A1* | 1/2019 | Saha | G06Q 10/1053 |
| 2019/0050750 | A1* | 2/2019 | Le | G06Q 10/1053 |
| 2019/0164085 | A1* | 5/2019 | Gulin | G06N 20/00 |

OTHER PUBLICATIONS

Chen, et al., "XGBoost: A Scalable Tree Boosting System", In Proceedings of the 22nd ACM SIGKDD International Conference on Knowledge Discovery and Data Mining, Aug. 13, 2016, 10 Pages.
He, et al., "Practical Lessons from Predicting Clicks on Ads at Facebook", In Proceedings of the Eighth International Workshop on Data Mining for Online Advertising, Aug. 24, 2014, 9 Pages.
McCulloch, Charles E., "Generalized Linear Mixed Models", In Proceedings of NSF-CBMS Regional Conference Series in Probability and Statistics, vol. 7, 2003, 91 Pages.
Saha, et al., "Generalized Linear Mixed Effect Models for Personalizing Job Search", In Proceedings of the 40th International ACM SIGIR Conference on Research and Development in Information Retrieval, Aug. 7, 2017, 4 Pages.
Zhang, et al., "GLMix: Generalized Linear Mixed Models for Large-Scale Response Prediction", In Proceedings of the 22nd ACM SIGKDD International Conference on Knowledge Discovery and Data Mining, Aug. 13, 2016, pp. 363-372.

* cited by examiner

*Primary Examiner* — Dawaune A Conyers
(74) *Attorney, Agent, or Firm* — Schwegman Lundberg & Woessner, P.A.

(57) ABSTRACT

In an example embodiment, gradient boosted decision trees are used to generate tree interaction features, which encode a set of decision rules for features of search results and hence allow feature interactions. These tree interaction features may then be used as features of a GLMix model, essentially injecting non-linearity into the GLMix model.

20 Claims, 12 Drawing Sheets

RECRUITER   PROJECTS   CLIPBOARD   JOBS   REPORTS   MORE          SAVED / HISTORY

1000

Q START A NEW SEARCH

SHOWING RESULTS FOR | •••  ∨         2.6K TOTAL      1.2K HAVE COMPANY      231 ENGAGED WITH YOUR
JOB TITLES   CURRENT                   CANDIDATES           CONNECTIONS              TALENT BRAND
( SOFTWARE ENGINEER ) +
+ SCIENTIST,                                                                                          NEW FEATURES ∨

LOCATIONS                    2,600 RESULTS - SORTED BY RELEVANCE                          1 – 26
+ ADD LOCATIONS
+ SAN FRANCISCO BAY AREA         FRANK JEFFRY [2ND]  ~1002
                                 STAFF SOFTWARE ENGINEER AT LINKEDIN
SKILLS                       SAN FRANCISCO BAY AREA - INTERNET
( PYTHON )( JAVA )( ALGORITHMS )  CURRENT   STAFF SOFTWARE ENGINEER - DATA MINING/DATA/ANALYSIS...
( MACHINE LEARNING )( GUOTIA )    PAST      SOFTWARE ENGINEER AT XYZ 2012-2016
( DATA MINING )                             SCIENTIST AT ABC 2011-2012
+ ARTIFICIAL INTELLIGENCE, +R,... EDUCATION THE UNIVERSITY OF TEXAS AT AUSTIN
                                            4 SHARED CONNECTIONS   1 MESSAGE   COMPANY FOL...
COMPANIES   CURRENT OR ... ∨
+ ADD COMPANIES                  JIMBO FRANKS [2ND]
+ XYZ, +ABC, +123                MACHINE LEARNING, RECOMMENDER SYSTEMS, INFORGUOTION...
                                 SAN FRANCISCO BAY AREA - INTERNET
SCHOOLS   ENDING ANY TO...    CURRENT   SOFTWARE ENGINEER AT ABC 2016-PRESENT
+ ADD SCHOOLS                     PAST      PRINCIPAL RESEARCH ENGINEER AT 123 2016-2016
                                            PRINCIPAL RESEARCH ENGINEER AT 123 2015-2016
INDUSTRIES                    EDUCATION UNIVERSITY OF FLORIDA 2002-2009
( INTERNET )( CONSUMER ELE... )             11 SHARED CONNECTIONS   1 MESSAGE   COMPANY FOL...

SHUN SHING [2ND]
                                 SOFTWARE ENGINEER INTERNSHIP AT XYZ
                                 GREATER NEW YORK CITY AREA - HIGHER EDUCATION

ENTITY-LEVEL SEARCH MODELS WITH TREE INTERACTION FEATURES

TECHNICAL FIELD

The present disclosure generally relates to computer technology for machine learned models. More specifically, the present disclosure relates to entity-level search models with tree interaction features.

BACKGROUND

The rise of the Internet has occasioned two phenomena: the increase in the presence of social networks, with their corresponding member profiles visible to large numbers of people, and the increase in use of social networks for job searches, both by applicants and by employers. Employers, or at least recruiters attempting to connect applicants and employers, often perform searches on social networks to identify candidates who have qualifications that make them good candidates for whatever job opening they are attempting to fill. The employers or recruiters then can contact these candidates to see if they are interested in applying for the job opening.

BRIEF DESCRIPTION OF THE DRAWINGS

Some embodiments of the technology are illustrated, by way of example and not limitation, in the figures of the accompanying drawings.

FIG. 10 is a screen capture illustrating a screen of a graphical user interface displaying search results in accordance with an example embodiment.

DETAILED DESCRIPTION

Overview

Figure 1:
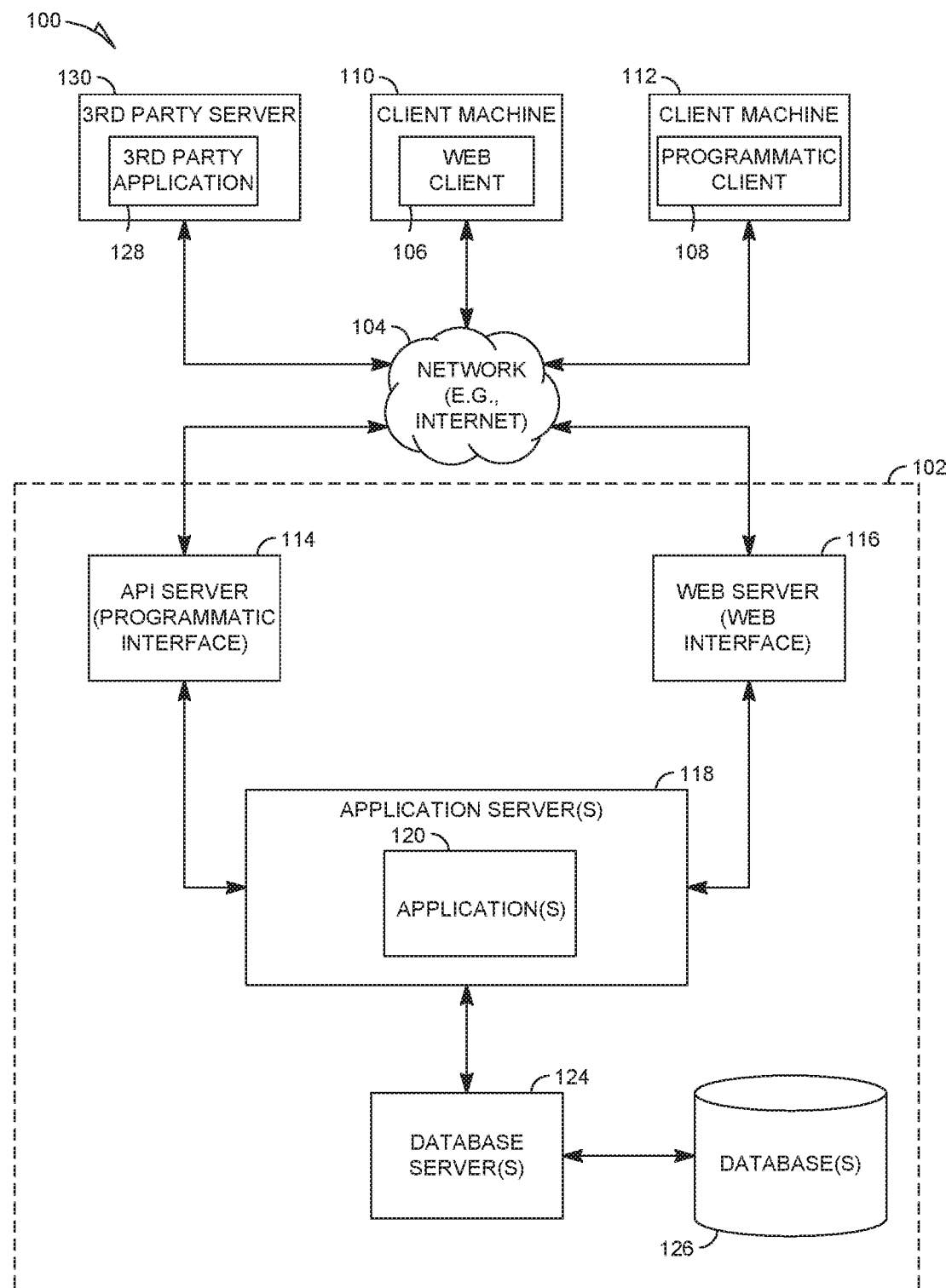
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

A technical problem encountered by social networking services in managing online candidate searches is that determining how to serve the most appropriate and relevant information with minimal delay becomes significantly challenging as the number of sources and volumes of information shared via the social networking services grows at an unprecedented pace. This includes determining how to recommend, for example, certain candidates over other candidates.

Personalization of candidate search and other results is also desirable. For example, when a recruiter performs a search for a query like "software engineer", depending on the skills, background, experience, location, and other factors about the recruiter, the odds that the recruiter will interact with the results (such as by sending an introductory email) can be drastically different.

Results may also be presented without an explicit search performed by a user, specifically in the form of recommendations. Recommender systems are automated computer programs that match items to users in different contexts. In order to achieve accurate recommendations on a large scale, machine learned models are used to estimate user preferences from user feedback data. Such models are constructed using large amounts of high-frequency data obtained from past user interactions with objects or results.

Historically, models to rank candidates in response to a query or perform other recommendations have heavily utilized text and entity-based features extracted from the query and job postings to derive a global ranking or recommendation. An example of such models is a generalized linear model (GLM). A GLM is a generalization of linear regression that allows for response variables that have error distribution models other than a normal distribution. The GLM generalizes linear regression by allowing the linear model to be related to the response variable via a link function and by allowing the magnitude of the variance of each measurement to be a function of its predicted value.

GLMs may utilize the following prediction formula:

$$g(\mathbb{E}[y_{ij}]) = x'_{ij}w$$

swhere this formula predicts the response of user i to item j, and $x_{ij}$ is a feature vector, w is a coefficient vector, $\mathbb{E}[y_{ij}]$ is an expectation of response, and g( ) is a link function. It should be noted that in the case of candidate searches, the items in questions may be the candidate search results, such as a brief summary of each candidates current job and experience. Similar techniques, however, can be applied to other type of items, such as feed items like articles, notifications, and job search results.

However, in scenarios where data is abundant, having a more fine-grained model at the user or item level would potentially lead to more accurate prediction, as the user's personal preferences on items and the item's specific attraction for users could be better captured.

One approach for better capturing a user's personal preference for items and an item's specific attraction for users in prediction/recommender systems would be to introduce ID-level regression coefficients in addition to the global regression coefficients in a GLM setting. Such a solution is known as a generalized linear mixed model (GLMix). While personalized, however, GLMix models do not allow for non-linear feature interactions.

In an example embodiment, gradient boosted decision trees are used to generate tree interaction features, which encode a set of decision rules and hence allow feature interactions. These tree interaction features may then be used as features of a GLMix model, essentially injecting non-linearity into the GLMix model.

GLMix models are an improvement over generalized linear models, where, in addition to a global model built on the overall training data, entity-level models are added, which introduce personalization for entities.

For a recruiter candidate search, a GLMix global plus per-recruiter plus per-contract model for a given combination of a request ID, context II), recruiter ID, candidate ID, and contract ID, represented by (r,c,re,ca,co), mamay be formulated as follows:

$$g(P(r,c,re,ca,co))=\beta_{global}*f_{all}+\beta_{re}*f_{all}+\beta_{co}*f_{all}$$

where, g( ) is the logit function, P(r, c, re, ca, co) is the probability of candidate ca to accept an email invitation to communicate, given the search query by recruiter re, which is tied to query request r, context c, and contract co. It should be noted that in the recruiter field, a contract denotes an agreement between a particular employer and a recruiter to locate one or more candidates for a job opening.

The first term on the right hand side is the global model score with $\beta_{global}$ as the global model coefficient vector, the second term on the right hand side is the per-recruiter model score with $\beta_{re}$ as the per-recruiter model coefficient vector for recruiter re, and the third term on the right hand side is the per-contract model score with $\beta_{co}$ as the per-contract model coefficient vector for contract co.

Feature set $f_{all}$ is composed of $f_{all}=f_{ltr} \cup f_{xgb} \cup f_{int}$, where $f_{ltr}$ is the set of Level 2 (L2) Learning-To-Rank (LTR) features, $f_{xgb}$ represents the score from a pre-trained Gradient Boosted Tree model, and $f_{int}$ represents the tree interaction features from a pre-trained Gradient Boosted Tree model. As an example, job_seeker_score is one of the LTR features, and a model can generate a rule (e.g. job_seeker_score>0.7) within one of the internal nodes in one tree, and a tree interaction score represented by one of the leaf nodes in a tree of the model is a combination of multiple rules encoded into a single rule set.

Two feature sets, $f_{xgb}$ and $f_{int}$, are generated based on a pre-trained Gradient Boosted Tree model used to score the same training set, which allows for interactions among features, and results in nonlinear tree interaction features and final score. Let the training set be D={$x_i,y_i$}, where $x_i \in \mathbb{R}^m$, $y_i \in \mathbb{R}$ with |D|=n examples and m features. A gradient boosted tree model is generated by an ensemble of tree models, which uses K regression trees represented as K additive functions to predict the final score of data point $x_i$:

$$g_{xgb}(x_i) = \sum_{k=1}^{K} f_k(f_{ltr}(x_i)), \quad f_k \in F$$

where F={f(x)=$w_{q(x)}$} is the set of regression trees, q: $\mathbb{R}^m \to T$ represents the structure of tree q which maps a data point $x_i \in \mathbb{R}^m$ to the corresponding leaf index in the tree, $w_q$ represents the leaf weight in the independent tree structure q, T represents the number of leaves in the tree, and $f_{ltr}(x_i)$ represents LTR features of data point $x_i$. Given this representation, for each data point $x_i$, it is scored using each tree $f_k$, where k∈{1, ..., K}, and $x_i$ lands on leaf node $l_i^k$ in tree $f_k$. Each data point ends up in one leaf node of each tree in the ensemble, which encodes a set of rules chosen from the root to the leaf node of the tree. These leaf nodes or tree interaction features for data point $x_i$ are represented as a (name, term, value) triple as follows:

$$f_{int}(x_i) = \bigcup_{k=1}^{K} (k, l_i^k, 1)$$

where k is the tree index, $l_i^k$ is the index of the leaf node for the k-th tree which data point $x_i$ landed on, and binary value 1 represents that data point $x_i$ landed on this leaf node. A third set of features, $f_{xgb}(x_i)$, is also used, which is the model prediction score:

$$f_{xgb}(x_i)=g_{xgb}(x_i)$$

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application programming interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., the API server 114) may communicate with the mobile app and the application server(s) 118 in order to make the features of the present disclosure available on the mobile device.

Figure 2:
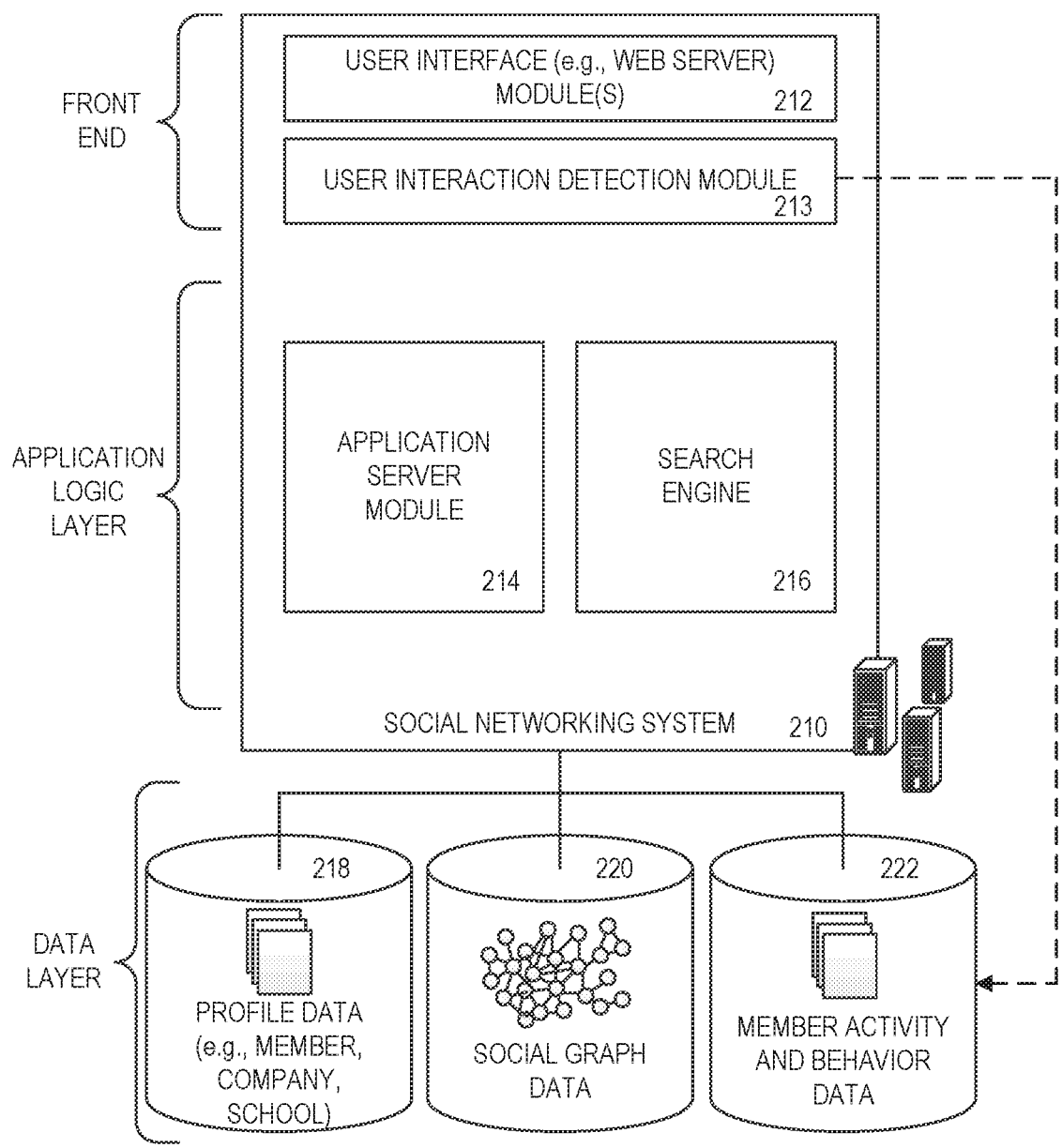
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level, or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, "following" another user typically is a unilateral operation and, at least in some embodiments, does not require acknowledgement or approval by the user who is being followed. When one user follows another, the user who is following may receive status updates (e.g., in an activity or content stream) or other messages published by the user being followed, or relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data teed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application 120 may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
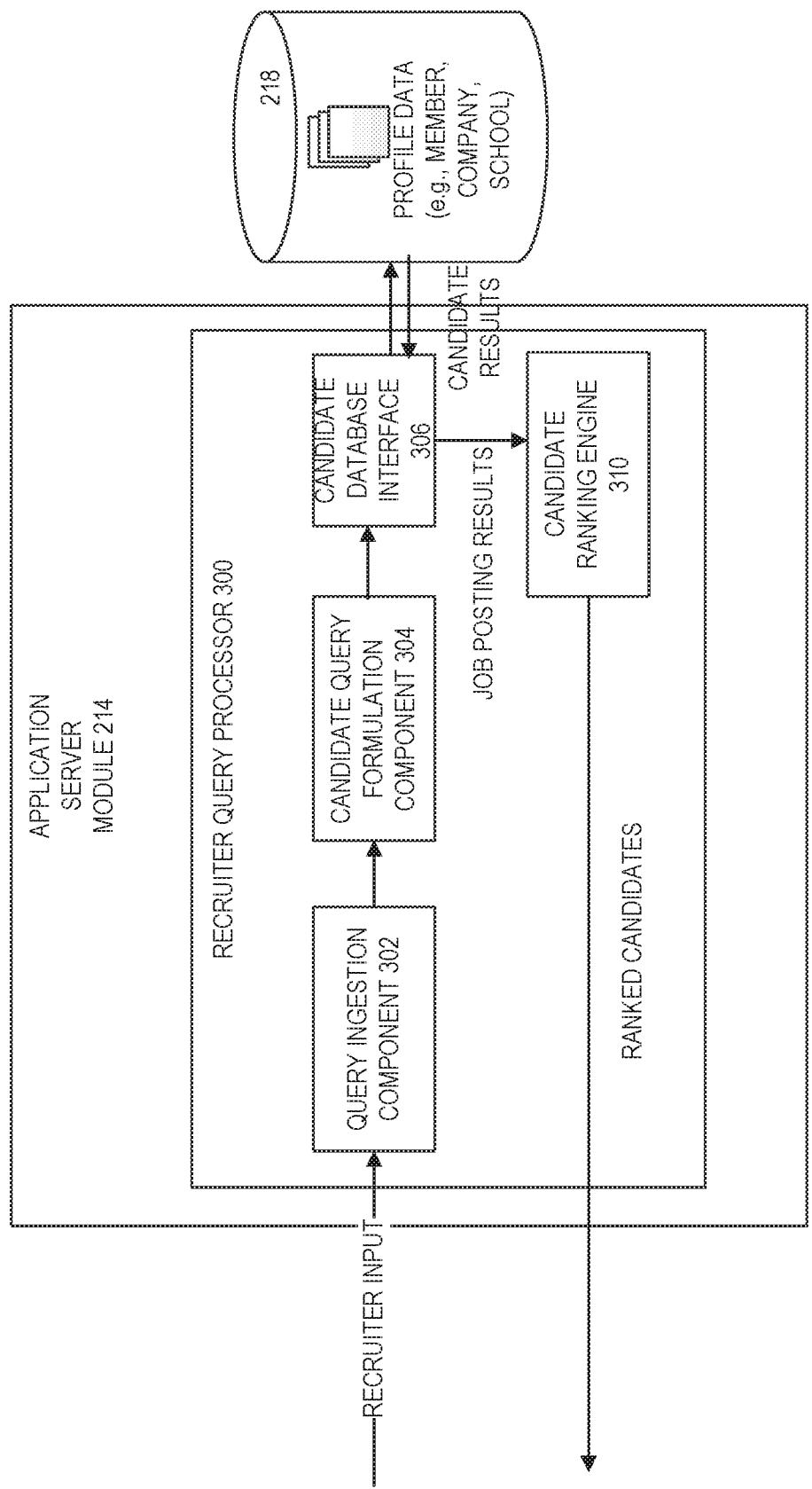
FIG. 3 is a block diagram illustrating the application server module of FIG. 2 in more detail.

FIG. 3 is a block diagram illustrating the application server module 214 of FIG. 2 in more detail. While in many embodiments the application server module 214 will contain many subcomponents used to perform various different actions within the social networking service system 210, in FIG. 3 only those components that are relevant to the present disclosure are depicted. A recruiter query processor 300 comprises a query ingestion component 302, which receives a user input "query" related to a candidate search via a user interface (not pictured). Notably, this user input may take many forms. In some example embodiments, the user may explicitly describe a particular characteristics desired in a candidate, such as skills and years of experience, such as by entering one or more keywords or terms into one or more fields of a user interface screen. In other example embodiments, the recruiter query may be inferred based on one or more user actions, such as selection of one or more filters, selection of "ideal" candidate profiles, etc.

This "query" may be sent to a candidate query formulation component 304, which formulates a candidate query, which will be sent via a candidate database interface 306 to profile database 218 (and/or other databases containing candidate information). Candidate results responsive to this candidate query may then be sent to the candidate ranking engine 310, again via the candidate database interface 306. The candidate ranking engine 310 then ranks the job posting results and sends the ranked job posting results back to the user interface for display to the user.

Figure 4:
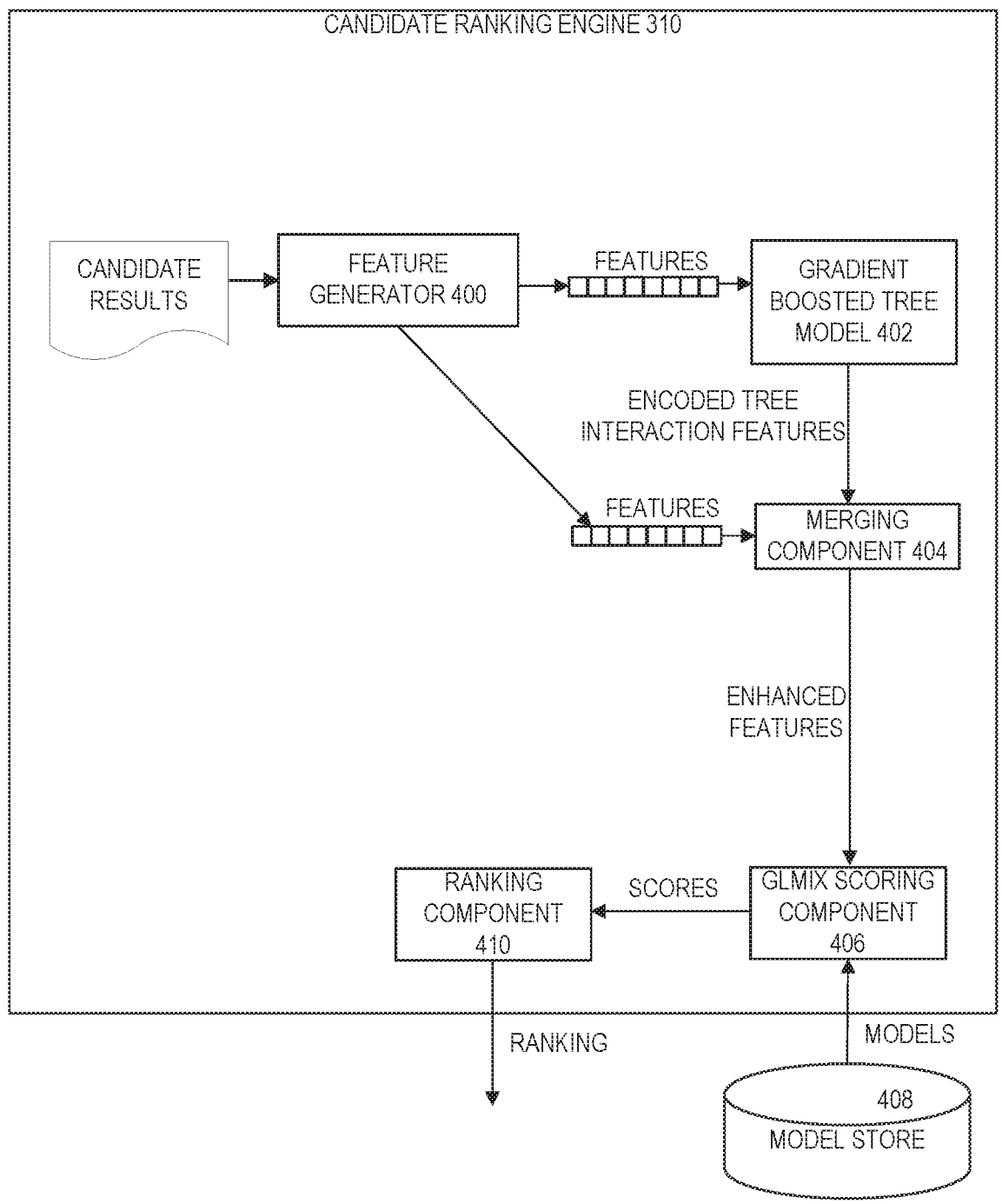
FIG. 4 is a block diagram illustrating a candidate ranking engine in more detail, in accordance with an example embodiment.

FIG. 4 is a block diagram illustrating a candidate ranking engine 310 in more detail, in accordance with an example embodiment. The candidate ranking engine 310 may take as input a set of candidates from the candidate results returned via the candidate database interface 306. It should be noted that in some example embodiment, there may be an initial ranking that is performed on the candidate results using a different model. This model may be termed the level 1 (L1) model and may generate a ranking score for the returned candidate results. This L1 model may use its own set of features, called L1 features. In some example embodiments these L1 features and/or the L1 scores can also be passed to the candidate ranking engine 310, which can use the L1 features and/or L1 scores along with its own L2 features.

A feature generator 400 may generate features from the candidate results. If Level 1 (L1) features are used earlier in the process, these new features may be called L2 features, and may include some or all of the L1 features as well as the newly generated features. These features may be passed to a gradient boosted tree model 402, which may generate tree interaction features from a gradient boosted tree formed from the features generated by the feature generator 400.

A merging component 404 may then merge the tree interaction features output by the gradient boosted tree model 402 and the features output by the feature generator 400 into a set of enriched features. These enriched features may then be input into a GLMix scoring component 406, which uses trained GLMix model(s) retrieved from a model store 408, such as a global model, a per-contract model, and a per-recruiter model, to output a score for each of the candidate results. These scores, and the candidate results, can then be passed to a ranking component 410 which ranks (or reranks) the candidate results based on these scores.

Figure 5:
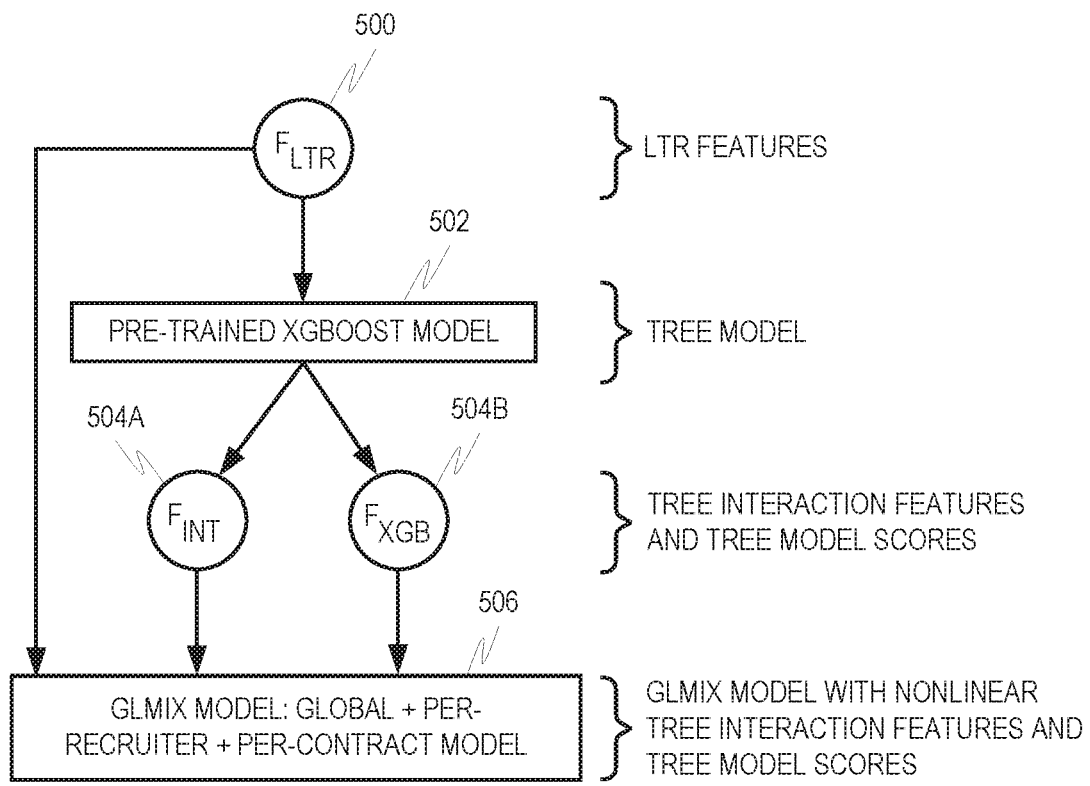
FIG. 5 is a block diagram illustrating a pipeline for GLMix models with nonlinear tree interaction features, in accordance with an example embodiment.

FIG. 5 is a block diagram illustrating a pipeline for GLMix models with nonlinear tree interaction features, in accordance with an example embodiment. Here, learning to rank features 500 may be passed first to a pre-trained tree boosting model 502, which outputs tree interaction features 504A, 504B. The tree interaction features are then passed as input to a GLMix model 506.

Figure 6:
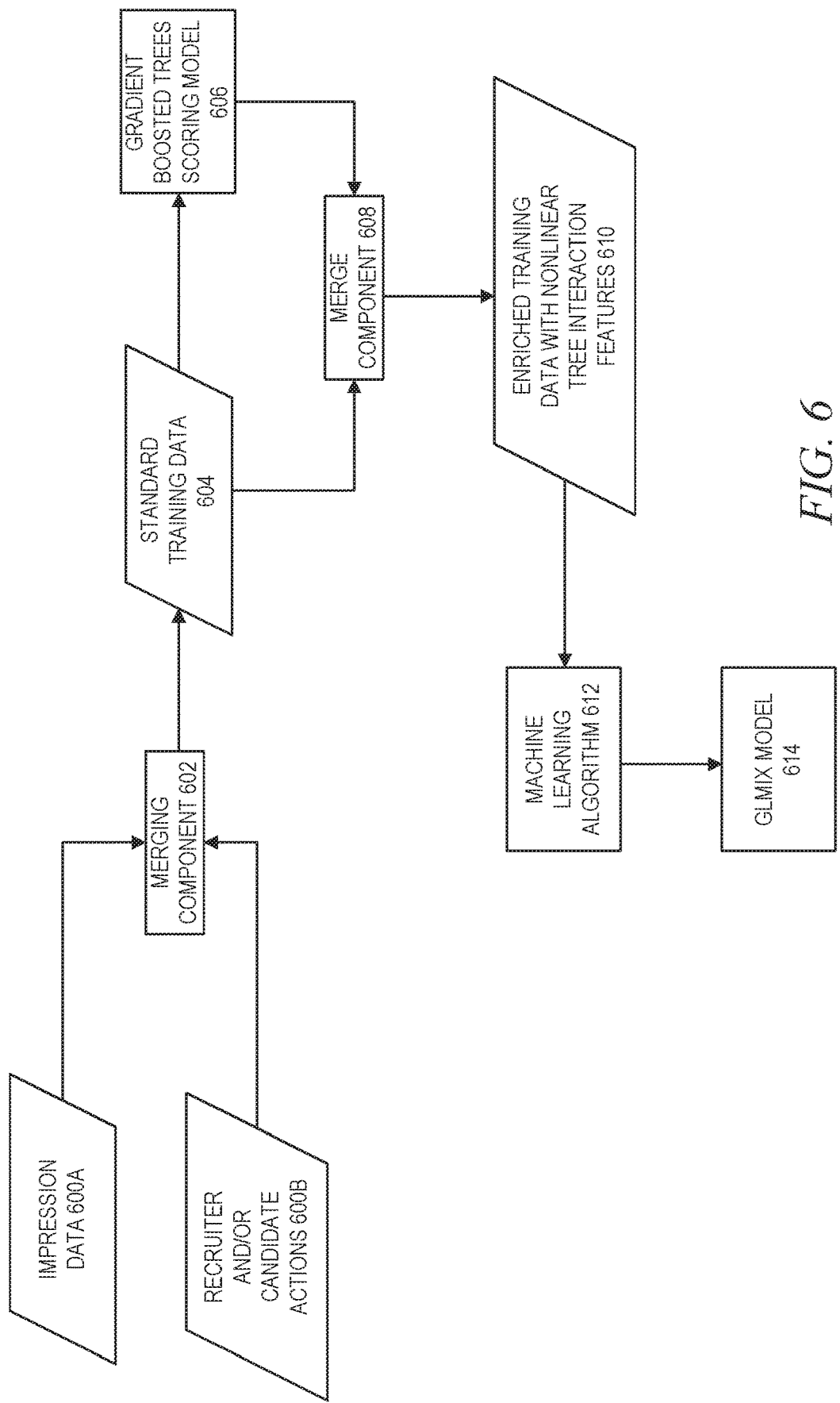
FIG. 6 is a block diagram illustrating an architecture for training a GLMix model in accordance with an example embodiment.

FIG. 6 is a block diagram illustrating an architecture for training a GLMix model 506 in accordance with an example embodiment. The first step is to generate labeled usage data, which utilizes impression data 600A (recommended candidates) and combines them with recruiter and/or candidate actions 600B, such as the sending of an email and/or the acceptance of an email, via a merging component 602, into a standard set of training data 604. This standard set of training data 604 is then fed to a gradient boosted trees scoring model 606, which outputs a set of tree interaction features to be merged by the merge component 608 with the standard set of training data 604, to form enriched training data with nonlinear tree interaction features 610. The enriched training data with nonlinear tree interaction features 610 is then fed to a machine learning algorithm 612 to train a GLMix model 614.

Figure 7:
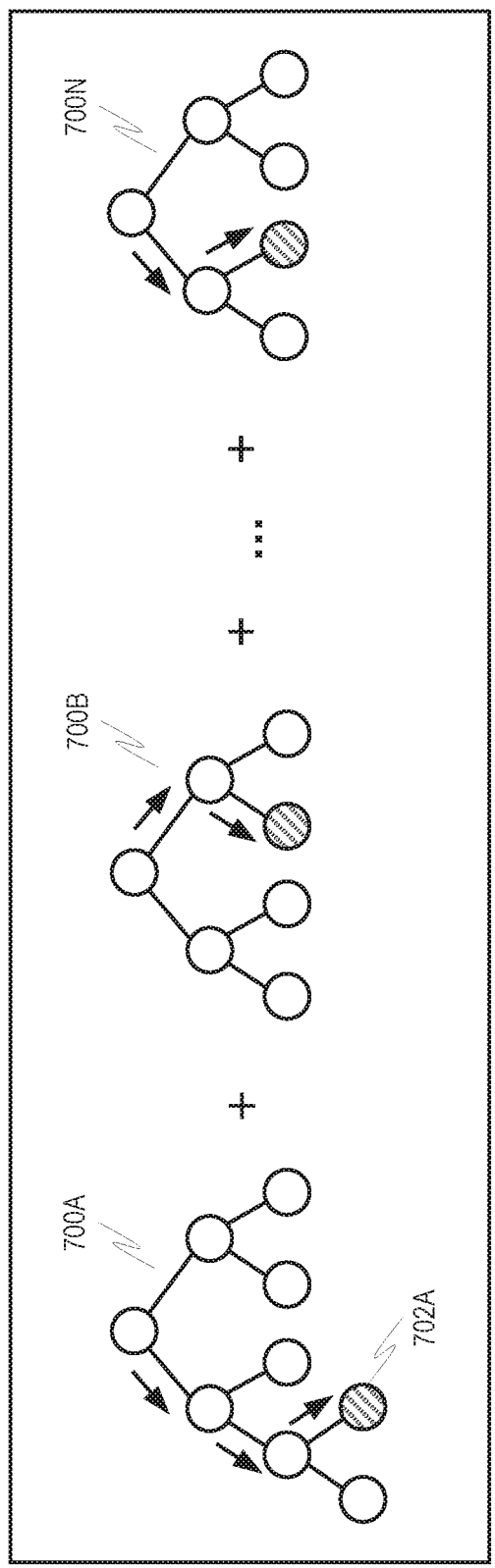
FIG. 7 is a diagram illustrating examples of gradient boosted trees, in accordance with an example embodiment.

FIG. 7 is a diagram illustrating examples of gradient boosted trees 700A, 700B, 700N, in accordance with an example embodiment. Each leaf node in each of these trees encodes a set of rules. The number of levels in the hierarchy of each tree indicates how many different features are combined in each nine. For example, in gradient boosted tree 700A, leaf node 702A may be an encoded rule that the candidate have a job seeker score (a score indicating the likelihood that the candidate is looking for a job) of greater than 0.8, an industry match score of greater than 0.7, and a location match score of greater than 0.9. Since there are four levels in this gradient boosted tree 700A, there are three different "decisions" that are made when traversing down the tree. Each of these decisions correspond to whether or not the corresponding feature rule is met.

Figure 8:
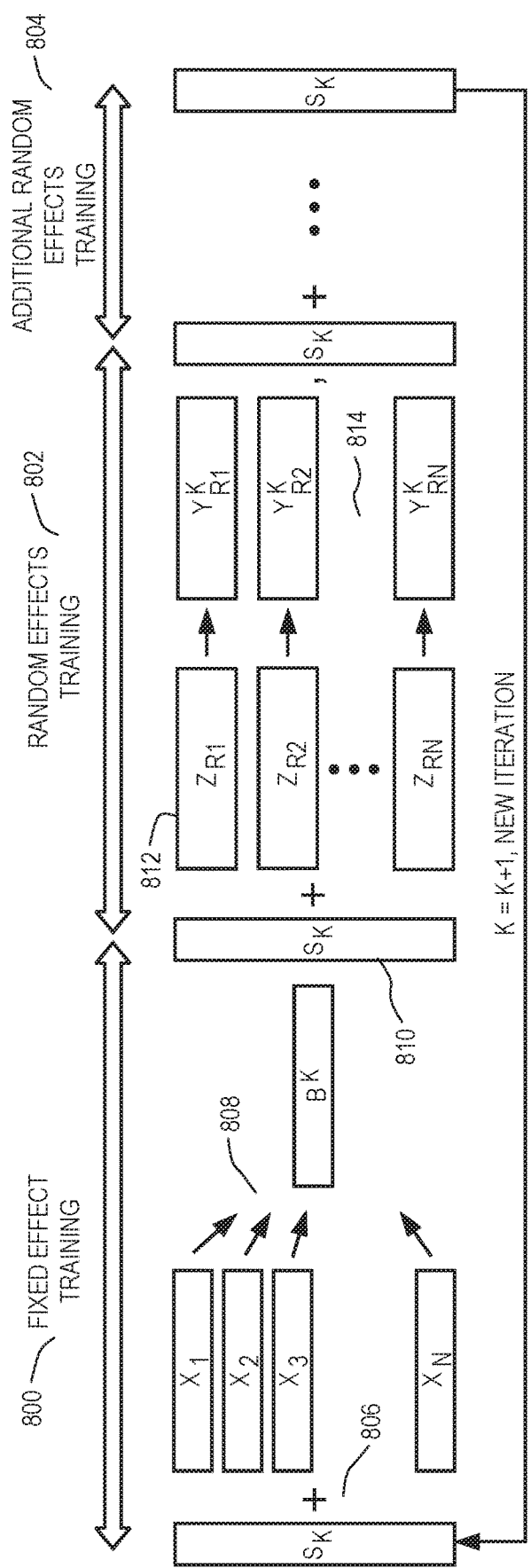
FIG. 8 is a block diagram illustrating the kth iteration of a parallelized block coordinate descent under a bulk synchronous parallel (BSP) paradigm, in accordance with an example embodiment.

Turning now to the training procedure used to generate personalized models, FIG. 8 is a block diagram illustrating the kth iteration of a parallelized block coordinate descent under a bulk synchronous parallel (BSP) paradigm, in accordance with an example embodiment. As can be seen, there is the fixed effects training 800, the random effects training 802, and any additional random effects training 804. The process begins with addressing the details of updating the fixed effect h at iteration k. Here, at 806, the training data is prepared with both the feature set $x_n$ and the latest score $s_n^k$ and they are partitioned into M nodes. Given the training data, numerous types of distributed algorithms can be applied to learn b. For example, the gradient of b at each sample n can be computed and aggregated from each node to the master node. The gradient may be aggregated in a parallel reduce operation, performed by one or more executor nodes, with the final product being known to the master node. The master node updates b. This is depicted at 808 in FIG. 8. The new coefficients $b^{new}$ are then broadcast back to each node together with $b^{old}$ to update the score s as in $s_n^{new} = s_n^{old} - x'_n b_{old} + x'_n b^{new}$, in order to prepare for the next effect's update. This is depicted at 810 in FIG. 8. Since the main network communication here is the transmission of b from the master node to the worker nodes, the overall network communication cost for one iteration of updating the fixed effects is $\mathcal{O}$ (MP). In some cases, convergence can be improved by updating b multiple times before updating the random effects, for each iteration.

The main technical challenge in designing a scalable architecture for GLMix on data sets with a large number of random effects is that the dimension of the random effect coefficient space can potentially be as large as $N_r P_r$. Therefore, if the same approach as the one used in updating fixed effects is used, the network communication cost for updating the random effects for r becomes $MN_r P_r$. Given some data of moderate size, for example, if $N_r = 10^6$, $P_r = 10^5$ and a cluster with M=100, the network input/output cost amounts to $10^{13}$. As a result, one key to making the process scalable is to avoid communicating or broadcasting the random effect coefficient across the computing nodes in the cluster.

Before the random effect updating phase and as a preprocessing step, for each random effect r and ID l, the feature vectors $z_{rn}$ are combined to form a feature matrix $Z_{rl}$, which comprises all of the $z_{rn}$ that satisfy i(r,n)=l. At iteration k and for random effect r, the current values of $s = \{s_n^k\}_{n \in \Omega}$ may be shuffled using the same strategy, i.e., or ID l, $s_n^k$ may be grouped to form a vector $S_l^k$, which comprises all of the $s_n^k$ that satisfy i(r,n)=l. With the right partitioning strategies, $S_l^k$ can be made to collocate with the corresponding feature matrix $Z_{rl}$ to prepare the training data for updating the random effects r using $$\gamma_{rl} = \underset{\gamma_{rl}}{\operatorname{argmax}} \left\{ \log p(\gamma_{rl}) + \sum_{n|i(r,n)=l} \log p(y_n \mid s_n - z'_{rn}\gamma_{rl}^{old} + z'_{rn}\gamma_{rl}) \right\}.$$

This is depicted at 812 in FIG. 8.

With the training data ready for each ID l, an optimizer can be applied again to solve the optimization problem locally, such that the random effects $\gamma r1$ can be learned in parallel without any additional network communication cost.

It should be noted that, because both the coefficients and data collocate in the same node, the scores can be updated locally within the same step, as depicted at 814 in FIG. 8. It should also be noted that, during the whole process, the random effect coefficients $\gamma r1$ live with the data and would never get communicated through the network; only $s_i$ would get shuffled around the nodes. As a result, the overall network communication cost for one iteration of updating one random effect is $\mathcal{O}$ ($|\Omega|$), and $\mathcal{O}$ ($|\mathcal{R}||\Omega|$) for $|\mathcal{R}|$ random effects.

Since the optimization problem can be solved locally, it is possible to further reduce the memory complexity C. Although the overall feature space size is $P_r$ for random effect r, sometimes the underlying dimension of the feature matrix $Z_{rl}$ could be smaller than $P_r$, due to the lack of support for certain features. For example, a member who is a software engineer is unlikely to be served jobs with the required skill "medicine". Hence there will not be any data for the featurejob skill=medicine for this user's random effects, and in such a scenario, $Z_{rl}$ would end up with an empty column. As a result, for each random effect r and ID l, $Z_{rl}$ can be condensed by removing all the empty columns and reindexing the features to form a more compact feature matrix, which would also reduce the size of random effect coefficients $\gamma r1$, and potentially improve the overall efficiency of solving the local optimization problem.

The result is that the fixed effects training 800 trains the fixed effects model and produces some residuals. These residuals are then used in the random effects training 802 to train the random effects model, which also produces some residuals. These residuals are then used in an additional effects training 804. This process iterates, passing the residuals from the additional effects training 804 back to the fixed effects training 800. These iterations continue until convergence occurs.

The residuals at each stage are the errors produced by whatever model is used by each stage. This allows any type of model to be used at any stage. Thus, the fixed effects model can be a completely different type of model than the random effects model. The residuals are the difference between the values produced by the model and a target.

Experimentation was performed to validate the performance of GLMix models with nonlinear tree interaction features. In these experiments, performance was measured by how often candidates contacted by the recruiter responded (e.g., email acceptance), based on various numbers of candidates returned. For experiments where one candidate was returned, the performance of GLMix models with nonlinear tree interaction features improved precision by 8.506%. For experiments where five candidates were returned, the performance of GLMix models with nonlinear tree interaction features improved precision by 4.742%. For experiments where twenty-five candidates were returned, the performance of GLMix models with nonlinear tree interaction features improved precision by 2.01%.

It should be noted that acceptance of an email can be measured in a number of different ways. Note that the use of the term email in the present document is intended to be broadly interpreted to include any sort of electronic messaging, including in-app or in-service messages. In some example embodiments, explicit buttons are provided in a graphical user interface allowing a recipient of an email to explicitly indicate interest (or non interest) in an email by pressing one or more buttons. For example, an "Interested" button can, if selected, indicate the recipient's interest in the email. A "No thanks" button can, if selected, indicate the recipient's non-interest in the email. Alternatively, the recipient's acceptance of an email can be inferred by other actions taken, such as saving the email, reading the email for a long period of time, forwarding the email, etc. If a text response is sent by the recipient, such as by composing and sending a response email, that text response can be parsed to determine whether the words indicate acceptance or rejection of the email.

Figure 9:
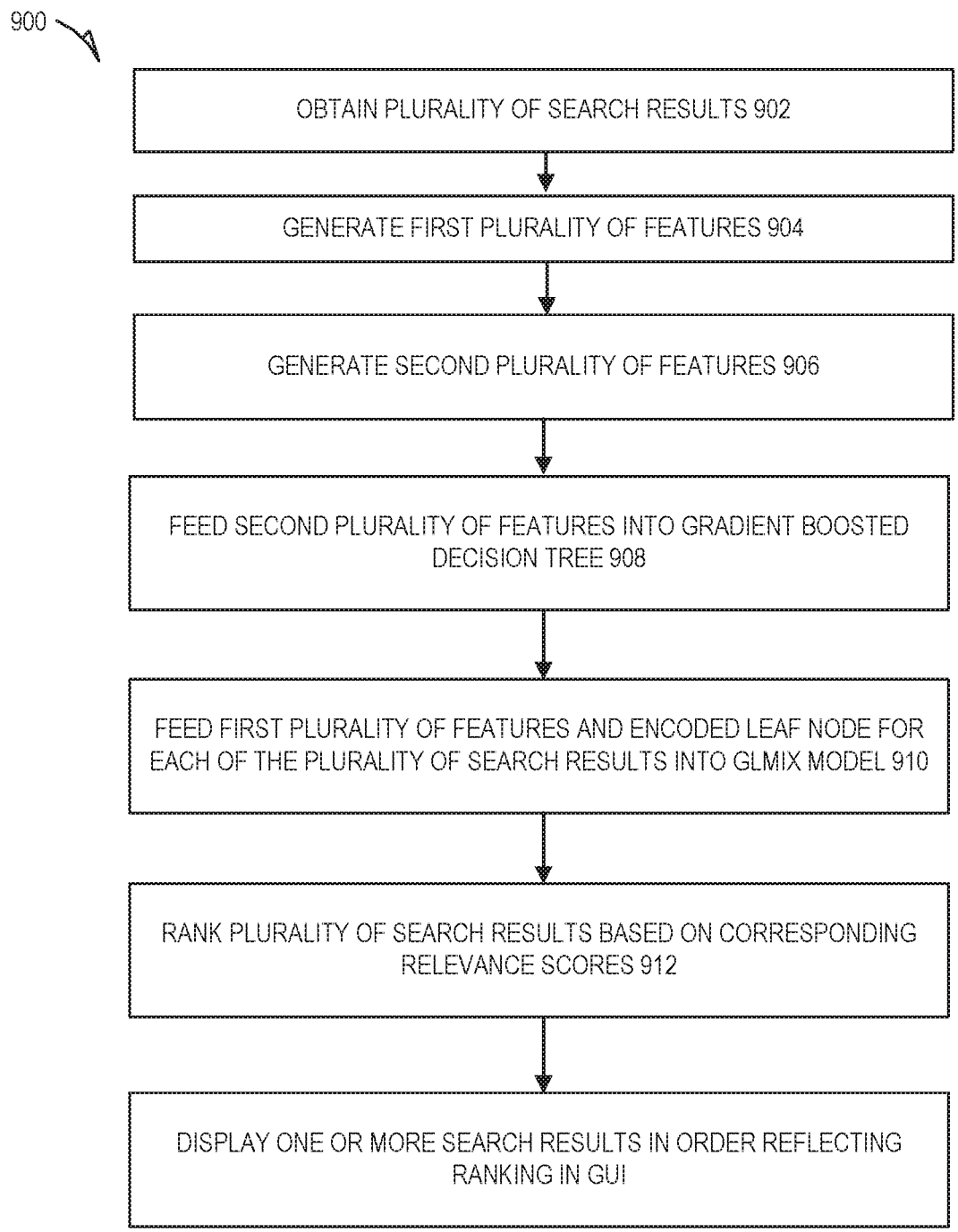
FIG. 9 is a flow diagram illustrating a method for ranking search results in accordance with an example embodiment.

FIG. 9 is a flow diagram illustrating a method 900 for ranking search results in accordance with an example embodiment. At operation 902, a plurality of search results in response to an online search are obtained. At operation 904, a first plurality of features are generated for each of the plurality of search results. At operation 906, a second plurality of features are generated for each of the plurality of search results.

At operation 908, the second plurality of features are fed into a gradient boosted decision tree. The gradient boosted decision tree comprises n levels of nodes. Each node connected to at least one other node via an edge. Each edge encodes a different decision for one of the second plurality of features. The gradient boosted decision tree encodes n−1 decisions. The result is an encoded leaf node describing interactions between the second plurality of features in the gradient boosted decision tree for each of the plurality of search results.

At operation 910, the first plurality of features and the encoded leaf node for each of the plurality of search results are fed into a generalized linear mixed effect (GLMix) model trained by a machine learning algorithm to provide a relevance score for each of the plurality of search results. It should be noted that, in some example embodiments, operations 908 and 910 can be performed in an interleaved fashion, where for each search result operations 908 and 910 are performed before performing operations 908 and 910 for the next search result.

At operation 912, the plurality of search results are ranked based on corresponding relevance scores. At operation 914, one or more of the search results may be displayed, in an order reflecting the ranking, in a graphical user interface.

FIG. 10 is a screen capture illustrating a screen 1000 of a graphical user interface displaying search results in accordance with an example embodiment. The screen 1000 presents results 1002 of the search query, ranked by relevance as determined by the GLMix model as described above.

Figure 11:
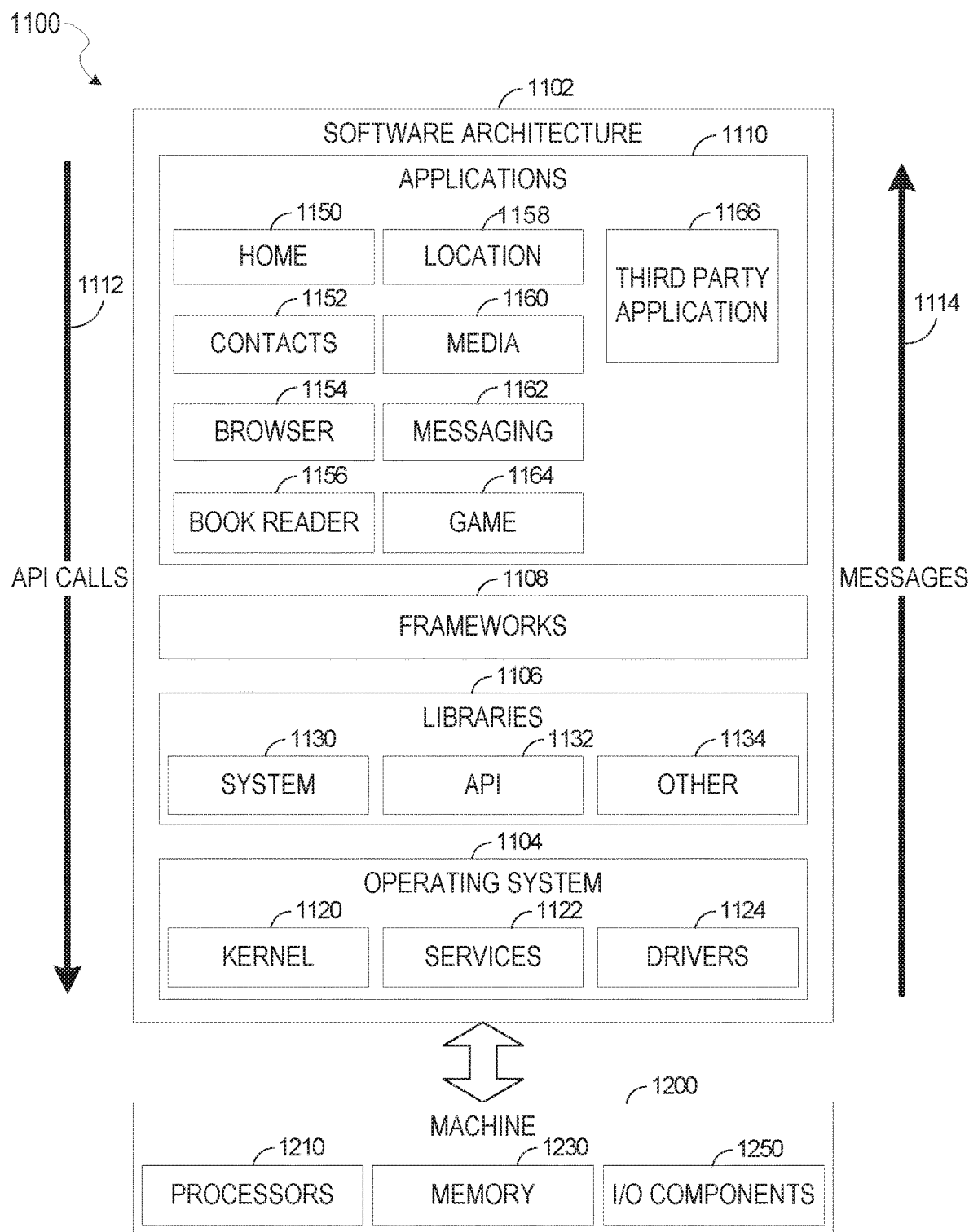
FIG. 11 is a block diagram illustrating a representative software architecture, which may be used in conjunction with various hardware architectures herein described.

FIG. 11 is a block diagram 1100 illustrating a software architecture 1102, which can be installed on any one or more of the devices described above. FIG. 11 is merely a non-limiting example of a software architecture, and it will be appreciated that many other architectures can be implemented to facilitate the functionality described herein. In various embodiments, the software architecture 1102 is implemented by hardware such as a machine 1200 of FIG. 12 that includes processors 1210, memory 1230, and input/output (I/O) components 1250. In this example architecture, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke API calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG), graphics libraries (e.g., an OpenGL framework used to render in two dimensions (2D) and three dimensions (3D) in a graphic context on a display), database libraries (e.g., SQLite to provide various relational database functions), web libraries (e.g., WehKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various GUI functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications, such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Figure 12:
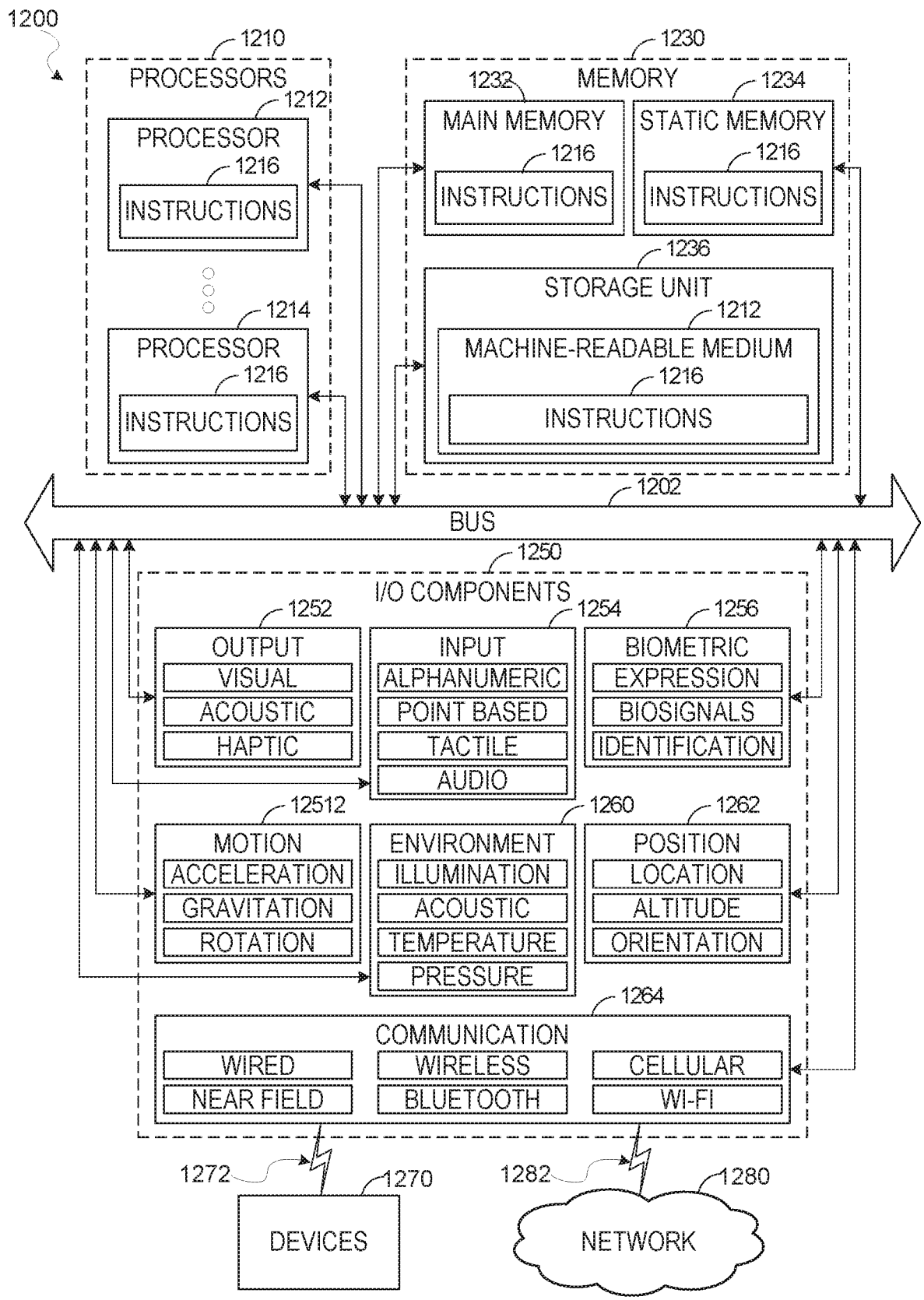
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 illustrates a diagrammatic representation of a machine 1200 in the form of a computer system within which a set of instructions may be executed for causing the machine to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application 1110, an applet, an app, or other executable code) for causing the machine 1200 to perform any one or more of the methodologies discussed herein may be executed. For example, the instructions 1216 may cause the machine 1200 to execute the method 900 of FIG. 9. Additionally, or alternatively, the instructions 1216 may implement FIGS. 1-10, and so forth. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions 1216 contemporaneously. Although FIG. 12 shows multiple processors 1210, the machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine 1200 will depend on the type of machine 1200. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion, and the grouping is in no way limiting. In various example embodiments, the I/O components 1250 may include output components 1252 and input components 1254. The output components 1252 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include radio frequency identification (RFM) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1230, 1232, 1234, and/or memory of the processor(s) 1210) and/or the storage unit 1236 may store one or more sets of instructions 1216 and data structures (e.g., software) embodying or utilized by any one or more of the methodologies or functions described herein. These instructions (e.g., the instructions 1216), when executed by the processor(s) 1210, causevarious operations to implement the disclosed embodiments.

As used herein, the terms "machine-storage medium," "device-storage medium," and "computer-storage medium" mean the same thing and may be used interchangeably. The terms refer to a single or multiple storage devices and/or media e.g., a centralized or distributed database, and/or associated caches and servers) that store executable instructions 1216 and/or data. The terms shall accordingly be taken to include, but not be limited to, solid-state memories, and optical and magnetic media, including memory internal or external to the processors 1210. Specific examples of machine-storage media, computer-storage media, and/or device-storage media include non-volatile memory, including by way of example semiconductor memnory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1280 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide interoperability for Microwave Access WiMAX), Long-Term Evolution (LTE) standard, others defined by various standard-setting organizations, other long-range protocols, or other data-transfer technology.

The instructions 1216 may be transmitted or received over the network 1280 using a transmission medium via a network interface device (e.g., a network interface component included in the communication components 1264) and utilizing any one of a number of well-known transfer protocols (e.g., HTTP). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   one or more processors;
   a computer-readable medium having instructions stored thereon, which, when executed by the one or more processors, cause the system to:
   obtain a plurality of search results in response to an online search;

generate a first plurality of features for each of the plurality of search results;

generate a second plurality of features for each of the plurality of search results;

feed the second plurality of features into a gradient boosted decision tree, the gradient boosted decision tree comprising n levels of nodes, each node connected to at least one other node via an edge, each edge encoding a different decision for one of the second plurality of features, the gradient boosted decision tree encoding n−1 decisions, producing an encoded leaf node describing interactions between the second plurality of features in the gradient boosted decision tree for each of the plurality of search results;

feed the first plurality of features and the encoded leaf node for each of the plurality of search results into a generalized linear mixed effect (GLMix) model trained by a machine learning algorithm to provide a relevance score for each of the plurality of search results;

rank the plurality of search results based on corresponding relevance scores; and display, in a graphical user interface, one or more of the search results in an order reflecting the ranking.

2. The system of claim 1, wherein the GLMix model includes a plurality of models, including a global model and one or more random effects models.

3. The system of claim 1, wherein the plurality of search results are candidates in a social networking service.

4. The system of claim 3, wherein the first plurality of features are generated, at least partially, from social networking service profiles for the candidates.

5. The system of claim 3, wherein the second plurality of features are generated, at least in part, based on information about a recruiter performing a search that results in the plurality of search results.

6. The system of claim 3, wherein the GLMix model is trained by feeding enriched training data including information about whether or not a corresponding social networking service member accepted a communication from a recruiter, into a machine learning algorithm, the enriched training data having been formed by combining training data with encoded features produced by feeding the training data into the gradient boosted decision tree.

7. The system of claim 1, wherein the GLMix model is implemented using parallelized block coordinate descent under a bulk synchronous parallel paradigm.

8. A computer-implemented method, comprising:

obtaining a plurality of search results in response to an online search;

generating a first plurality of features for each of the plurality of search results;

generating a second plurality of features for each of the plurality of search results;

feeding the second plurality of features into a gradient boosted decision tree, the gradient boosted decision tree comprising n levels of nodes, each node connected to at least one other node via an edge, each edge encoding a different decision for one of the second plurality of features, the gradient boosted decision tree encoding n−1 decisions, producing an encoded leaf node describing interactions between the second plurality of features in the gradient boosted decision tree for each of the plurality of search results;

feeding the first plurality of features and the encoded leaf node for each of the plurality of search results into a generalized linear mixed effect (GLMix) model trained by a machine learning algorithm to provide a relevance score for each of the plurality of search results;

ranking the plurality of search results based on corresponding relevance scores; and displaying, in a graphical user interface, one or more of the search results in an order reflecting the ranking.

9. The computer-implemented method of claim 8, wherein the GLMix model includes a plurality of models, including a global model and one or more random effects models.

10. The computer-implemented method of claim 8, wherein the plurality of search results are candidates in a social networking service.

11. The computer-implemented method of claim 10, wherein the first plurality of features are generated, at least partially, from social networking service profiles for the candidates.

12. The computer-implemented method of claim 10, wherein the second plurality of features are generated, at least in part, based on information about a recruiter performing a search that results in the plurality of search results.

13. The computer-implemented method of claim 10, wherein the GLMix model is trained by feeding enriched training data including information about whether or not a corresponding social networking service member accepted a communication from a recruiter, into a machine learning algorithm, the enriched training data having been formed by combining training data with encoded features produced by feeding the training data into the gradient boosted decision tree.

14. The computer-implemented method of claim 8, wherein the GLMix model is implemented using parallelized block coordinate descent under a bulk synchronous parallel paradigm.

15. A non-transitory machine-readable storage medium comprising instructions, which when implemented by one or more machines, cause the one or more machines to perform operations comprising:

obtaining a plurality of search results in response to an online search;

generating a first plurality of features for each of the plurality of search results;

generating a second plurality of features for each of the plurality of search results;

feeding the second plurality of features into a gradient boosted decision tree, the gradient boosted decision tree comprising n levels of nodes, each node connected to at least one other node via an edge, each edge encoding a different decision for one of the second plurality of features, the gradient boosted decision tree encoding n−1 decisions, producing an encoded leaf node describing interactions between the second plurality of features in the gradient boosted decision tree for each of the plurality of search results;

feeding the first plurality of features and the encoded leaf node for each of the plurality of search results into a generalized linear mixed effect (GLMix) model trained by a machine learning algorithm to provide a relevance score for each of the plurality of search results;

ranking the plurality of search results based on corresponding relevance scores; and displaying, in a graphical user interface; one or more of the search results in an order reflecting the ranking.

16. The non-transitory machine-readable storage medium of claim 15, wherein the GLMix model includes a plurality of models, including a global model and one or more random effects models.

17. The non-transitory machine-readable storage medium of claim 15, wherein the plurality of search results are candidates in a social networking service.

18. The non-transitory machine-readable storage medium of claim 17, wherein the first plurality of features are generated, at least partially, from social networking service profiles for the candidates.

19. The non-transitory machine-readable storage medium of claim 17, wherein the second plurality of features are generated, at least in part, based on information about a recruiter performing a search that results in the plurality of search results.

20. The non-transitory machine-readable storage medium of claim 17, wherein the GLMix model is trained by feeding enriched training data including information about whether or not a corresponding social networking service member accepted a communication from a recruiter, into a machine learning algorithm, the enriched training data having been formed by combining training data with encoded features produced by feeding the training data into the gradient boosted decision tree.

\* \* \* \* \*

UNITED STATES PATENT AND TRADEMARK OFFICE
CERTIFICATE OF CORRECTION

PATENT NO. : 11,016,983 B2
APPLICATION NO. : 16/110434
DATED : May 25, 2021
INVENTOR(S) : Ozcaglar et al.

It is certified that error appears in the above-identified patent and that said Letters Patent is hereby corrected as shown below:

In the Claims

In Column 18, Line 62, in Claim 15, delete "interface;" and insert --interface,-- therefor Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*